United States Patent
Hemingway

(10) Patent No.: US 8,955,259 B2
(45) Date of Patent: Feb. 17, 2015

(54) SOLAR PANEL ATTACHMENT SYSTEM FOR A ROOF

(75) Inventor: Todd L. Hemingway, Metamora, MI (US)

(73) Assignee: A. Raymond & Cie, Grenoble (FR)

( * ) Notice: Subject to any disclaimer, the term of this patent is extended or adjusted under 35 U.S.C. 154(b) by 0 days.

(21) Appl. No.: 14/125,001

(22) PCT Filed: Jun. 8, 2012

(86) PCT No.: PCT/US2012/041525
§ 371 (c)(1),
(2), (4) Date: Dec. 9, 2013

(87) PCT Pub. No.: WO2012/170799
PCT Pub. Date: Dec. 13, 2012

(65) Prior Publication Data
US 2014/0102016 A1    Apr. 17, 2014

Related U.S. Application Data

(60) Provisional application No. 61/495,071, filed on Jun. 9, 2011.

(51) Int. Cl.
*E04D 13/00*    (2006.01)
*F24J 2/52*     (2006.01)
*H01L 31/042*   (2014.01)
(Continued)

(52) U.S. Cl.
CPC ............. *F24J 2/5245* (2013.01); *F24J 2/5256* (2013.01); *F24J 2/5249* (2013.01); *H01L 31/0422* (2013.01); *H01L 31/0482* (2013.01); *F24J 2002/4665* (2013.01); *Y02B 10/20* (2013.01); *Y02B 10/12* (2013.01); *Y02E 10/47* (2013.01); *Y02E 10/50* (2013.01)
USPC ............................................. 52/24

(58) Field of Classification Search
USPC ...................... 52/24–26, 173.3, 489.2, 489.1; 403/321, 322.4; 248/221.11, 222.13, 248/680, 205.3, 500
See application file for complete search history.

(56) References Cited

U.S. PATENT DOCUMENTS 3,122,604 A    2/1964   Cook
3,528,050 A    9/1970   Hindenburg
(Continued)

FOREIGN PATENT DOCUMENTS

DE    202008011312 U1    12/2008
DE    102010022556 B3    6/2011
(Continued)

OTHER PUBLICATIONS

A Raymond drawing entitled "Solar clip Specific part"; Part No. 214803-1-00, for non-grounding clip shown in Solardis brochure; 1 page (believed to have been offered for sale in U.S. or published on or before Jul. 7, 2010).
(Continued)

*Primary Examiner* — Mark Wendell
*Assistant Examiner* — Keith Minter
(74) *Attorney, Agent, or Firm* — Harness, Dickey & Pierce, P.L.C.

(57) ABSTRACT

An attachment system is provided. In another aspect, a latching assembly is mounted to a building roof. Another aspect employs a moveable latch that removeably attaches an auxiliary component, such as a solar panel, to a building in a single motion and/or snap-in installation manner.

20 Claims, 8 Drawing Sheets

(51) Int. Cl.
*H01L 31/048* (2014.01)
*F24J 2/46* (2006.01)

(56) References Cited

U.S. PATENT DOCUMENTS

| | | | |
|---|---|---|---|
| 3,757,268 A | 9/1973 | Genovese et al. | |
| 3,998,018 A | 12/1976 | Hodges | |
| 4,029,384 A | 6/1977 | Reinwall, Jr. | |
| 4,042,201 A * | 8/1977 | O'Callaghan | 248/309.1 |
| 4,106,251 A | 8/1978 | Nelsson | |
| 4,113,982 A | 9/1978 | Glaesel | |
| 4,189,881 A | 2/1980 | Hawley | |
| 4,195,895 A | 4/1980 | Ziegler | |
| 4,215,677 A | 8/1980 | Erickson | |
| 4,256,359 A | 3/1981 | Storck | |
| 4,406,505 A | 9/1983 | Avramovich | |
| 4,669,808 A | 6/1987 | Owen | |
| 4,833,848 A | 5/1989 | Guerin et al. | |
| 4,875,876 A | 10/1989 | O'Loughlin | |
| 4,993,959 A | 2/1991 | Randolph | |
| 5,092,939 A | 3/1992 | Nath et al. | |
| 5,108,055 A | 4/1992 | Kreinberg et al. | |
| 5,164,545 A | 11/1992 | Kreinberg et al. | |
| 5,232,518 A | 8/1993 | Nath et al. | |
| 5,409,549 A | 4/1995 | Mori | |
| 5,419,606 A | 5/1995 | Hull et al. | |
| 5,451,167 A | 9/1995 | Zielinski et al. | |
| 5,571,338 A | 11/1996 | Kadonome et al. | |
| 5,715,640 A | 2/1998 | Haddock | |
| 5,762,720 A | 6/1998 | Hanoka et al. | |
| 6,105,317 A | 8/2000 | Tomiuchi et al. | |
| 6,106,310 A | 8/2000 | Davis et al. | |
| 6,111,189 A | 8/2000 | Garvison et al. | |
| 6,123,314 A * | 9/2000 | Steele | 248/681 |
| 6,186,698 B1 | 2/2001 | Knapp | |
| 6,260,321 B1 | 7/2001 | Rudduck | |
| 6,269,596 B1 | 8/2001 | Ohtsuka et al. | |
| 6,276,947 B1 | 8/2001 | Homfeldt et al. | |
| 6,370,828 B1 | 4/2002 | Genschorek | |
| 6,405,494 B1 | 6/2002 | Wismeth | |
| 6,672,018 B2 | 1/2004 | Shingleton | |
| 6,784,360 B2 | 8/2004 | Nakajima et al. | |
| 6,959,517 B2 | 11/2005 | Poddany et al. | |
| 7,150,661 B2 | 12/2006 | Cisey | |
| 7,195,513 B1 | 3/2007 | Gherardini et al. | |
| 7,217,058 B2 | 5/2007 | Herb | |
| 7,260,918 B2 | 8/2007 | Liebendorfer | |
| 7,297,866 B2 | 11/2007 | Aschenbrenner | |
| 7,386,922 B1 | 6/2008 | Taylor et al. | |
| 7,434,853 B2 | 10/2008 | Yamamoto et al. | |
| 7,435,134 B2 | 10/2008 | Lenox | |
| 7,592,537 B1 | 9/2009 | West | |
| 7,600,349 B2 | 10/2009 | Liebendorfer | |
| 7,621,487 B2 | 11/2009 | Brown et al. | |
| 7,634,875 B2 | 12/2009 | Genschorek | |
| 7,686,625 B1 | 3/2010 | Dyer et al. | |
| 7,731,544 B2 | 6/2010 | Ma et al. | |
| 7,745,722 B2 | 6/2010 | Warfield et al. | |
| 7,748,175 B2 | 7/2010 | Liebendorfer | |
| 7,758,011 B2 | 7/2010 | Haddock | |
| D621,690 S | 8/2010 | Honnecke et al. | |
| 7,766,292 B2 | 8/2010 | Liebendorfer | |
| 7,780,472 B2 | 8/2010 | Lenox | |
| 7,797,883 B2 | 9/2010 | Tarbell et al. | |
| 7,814,899 B1 | 10/2010 | Port | |
| 7,827,836 B2 | 11/2010 | Cetnar | |
| 7,832,157 B2 | 11/2010 | Cinnamon | |
| 7,866,098 B2 | 1/2011 | Cinnamon | |
| 7,866,099 B2 | 1/2011 | Komamine et al. | |
| 7,921,607 B2 | 4/2011 | Thompson et al. | |
| 7,971,398 B2 | 7/2011 | Tweedie | |
| 7,987,641 B2 | 8/2011 | Cinnamon | |
| 8,025,508 B2 | 9/2011 | Parker et al. | |
| 8,109,048 B2 | 2/2012 | West et al. | |
| 8,234,825 B2 | 8/2012 | Schwarze et al. | |
| 8,256,169 B2 | 9/2012 | Cusson et al. | |
| 8,387,319 B1 * | 3/2013 | Gilles-Gagnon et al. | 52/173.3 |
| 8,713,881 B2 * | 5/2014 | DuPont et al. | 52/489.2 |
| 2003/0101662 A1 | 6/2003 | Ullman | |
| 2003/0177706 A1 | 9/2003 | Ullman | |
| 2003/0217890 A1 * | 11/2003 | Nicolaysen | 182/45 |
| 2006/0156648 A1 | 7/2006 | Thompson et al. | |
| 2008/0035140 A1 | 2/2008 | Placer et al. | |
| 2008/0053517 A1 | 3/2008 | Plaisted et al. | |
| 2008/0245404 A1 | 10/2008 | DeLiddo | |
| 2008/0257402 A1 | 10/2008 | Kamp et al. | |
| 2009/0019796 A1 | 1/2009 | Liebendorfer | |
| 2009/0242014 A1 | 10/2009 | Leary | |
| 2010/0180933 A1 | 7/2010 | Aftanas et al. | |
| 2010/0192505 A1 | 8/2010 | Schaefer et al. | |
| 2010/0236162 A1 | 9/2010 | Tweedie | |
| 2010/0236542 A1 | 9/2010 | Pierson et al. | |
| 2010/0263297 A1 | 10/2010 | Liebendorfer | |
| 2010/0275975 A1 | 11/2010 | Monschke et al. | |
| 2010/0276558 A1 | 11/2010 | Faust et al. | |
| 2010/0283271 A1 * | 11/2010 | Hemingway et al. | 292/341.15 |
| 2010/0294340 A1 | 11/2010 | Cunningham et al. | |
| 2011/0036028 A1 | 2/2011 | Beck | |
| 2011/0039430 A1 | 2/2011 | Aftanas | |
| 2011/0067693 A1 | 3/2011 | Paull | |
| 2011/0073155 A1 | 3/2011 | Sillmann et al. | |
| 2011/0088740 A1 | 4/2011 | Mittan et al. | |
| 2011/0100433 A1 | 5/2011 | Jonczyk | |
| 2011/0108083 A1 | 5/2011 | Ravestein et al. | |
| 2011/0138585 A1 | 6/2011 | Kmita et al. | |
| 2011/0147553 A1 | 6/2011 | Ostermeier et al. | |
| 2011/0179606 A1 | 7/2011 | Magno, Jr. et al. | |
| 2011/0203637 A1 | 8/2011 | Patton et al. | |
| 2011/0214366 A1 | 9/2011 | Haddock et al. | |
| 2011/0232212 A1 | 9/2011 | Pierson et al. | |
| 2011/0284058 A1 | 11/2011 | Cinnamon | |
| 2012/0267490 A1 * | 10/2012 | Haddock et al. | 248/221.11 |
| 2012/0304556 A1 * | 12/2012 | Teller et al. | 52/173.1 |
| 2013/0091786 A1 * | 4/2013 | DuPont et al. | 52/173.3 |
| 2013/0192150 A1 * | 8/2013 | DuPont et al. | 52/173.3 |
| 2013/0193301 A1 * | 8/2013 | Jackson et al. | 248/676 |
| 2014/0230877 A1 * | 8/2014 | Goldberg et al. | 136/244 |

FOREIGN PATENT DOCUMENTS

| | | |
|---|---|---|
| EP | 0671581 A2 | 9/1995 |
| FR | 2163787 A5 | 7/1973 |
| FR | 2209024 A1 | 6/1974 |
| GB | 423385 A | 1/1935 |
| GB | 1218275 A | 1/1971 |
| GB | 1510258 A | 5/1978 |
| JP | 7243428 A | 9/1995 |
| JP | 10266499 A | 10/1998 |
| JP | 10339008 A | 12/1998 |
| NL | 8304155 A | 7/1985 |
| WO | WO-8301476 A1 | 4/1983 |
| WO | WO-2010149278 A1 | 12/2010 |

OTHER PUBLICATIONS altEstore; Internet Advertisement Publication; "Groundings Lugs With Set Screw"; www.altestore.com; Aug. 25, 2011.

Rayvolt; Internet Advertisement Publication; "Panel fasteners"; Raygroup; May 2011.

Solardis; Brochure; "soprasolar fix"; www.soprasolar.com; Jul. 7, 2010; pp. 1-10.

CMS Internet Advertisement; Gate Latch Galvanized, www.creativemerchandisestore.com/servlet/the-776/Gate-Latch-Galvanized/Detail, printed Jun. 9, 2011, 2 pages (believed to have been published or offered for sale prior to Jun. 2011).

Lokk Latch Installation Instuctions, D&D Technologies, 3 pages (believed to have been published or offered for sale prior to Jun. 2011).

Keystone Advantage™ Installation, Adjustment and Maintenance Instructions; Nationwide Industries, 3 pages (believed to have been published or offered for sale prior to Jun. 2011).

(56) References Cited

OTHER PUBLICATIONS

Lokk-Latch® Lockable, General-Purpose Gate Latch, Hoover Fence Company, http://www.hooverfence.com/vinyl/hardware/lokk-latch-s2.htm, 2 pages (believed to have been published or offered for sale prior to Jun. 2011).

Lokk Latch Series 2 (latch only); http://hooverfence.com/vinyl/hardware/img/Lokk-LatchS2_specs.jpg, 1 page (believed to have been published or offered for sale prior to Jun. 2011).

Keystone Advantage Gate Latch™ internet advertisement; http://www.hooverfence.com/catalog/hardware/keystone-gate-latch.htm, 2 pages (believed to have been published or offered for sale prior to Jun. 2011).

S-5!®, S-5-PV Kit brochure, Jun. 2010, four pages.

Prior Mounting and Racking Hardware for Roof-Mounted Solar Panels, 1 page (sold or publicly used in United States prior to Jun. 2011).

S-5!® Tool Tips, http://www.s-5/snow/index_238.cfm, printed Jun. 6, 2011, 3 pages.

International Search Report, ISA/EP, Risjwijk, NL, mailed May 15, 2013.

Written Opinion of the ISA, ISA/EP, Munich, mailed May 15, 2013.

* cited by examiner

US 8,955,259 B2

SOLAR PANEL ATTACHMENT SYSTEM FOR A ROOF

CROSS-REFERENCE TO RELATED APPLICATIONS

This application is a 371 National Phase of PCT/US2012/041525, filed Jun. 8, 2012, and published in English as WO 2012/170799 A2 on Dec. 13, 2012, which claims the benefit of U.S. Provisional Application Ser. No. 61/495,071, filed on Jun. 9, 2011, both of which are incorporated by reference herein.

BACKGROUND AND SUMMARY

The present application relates generally to an attachment system and more particularly to a solar panel attachment system for a roof of a building.

Conventional photovoltaic or solar panels are mounted to roofs of buildings through screw-in clips or the like. Examples of such conventional devices are disclosed in U.S. Patent Publication No. 2011/0088740 entitled "Photovoltaic Panel Clamp" which published to Mittan et al. on Apr. 21, 2011, and U.S. Pat. No. 6,672,018 entitled "Solar Module Mounting Method and Clip" which issued to Shingleton on Jan. 6, 2004, both of which are incorporated by reference herein. Such conventional methods cause the installer to juggle many loose fasteners while simultaneously holding heavy solar panels and/or roof mounting components, often on a tilted metal roof in unpleasant weather conditions. Furthermore, such traditional multi-piece screw or bolt arrangements take considerable time to install while also having inconsistent installation torque values, especially in the common situation where many of these solar panel mounting devices are required for each roof.

In accordance with the present invention, an attachment system is provided. In another aspect, a latching assembly is mounted to a building roof. Another aspect employs a moveable latch that removeably attaches an auxiliary component, such as a solar panel, to a building in a single motion and/or snap-in installation manner. A method of installing a latch assembly is additionally provided. Furthermore, a method of manufacturing a latch assembly is disclosed.

The present attachment system is advantagous over traditional devices. For example, in one aspect, a single motion installation is employed to engage an auxiliary roof component, such as a solar panel, for latch engagement without requiring tools. In an aspect of the present attachment system, an auxiliary roof component is quickly and easily secured to a building roof in a fast manner without requiring the installer to juggle multiple parts. In another aspect, a striker or protruding member is preassembled directly to a glass surface of a solar panel and a latch assembly is preassembled to a building roof via an easy to install roof clamp, prior to assembly of the solar panel to the latch assembly. Moreover, the auxiliary roof component can be easily detached from the latch assembly in an aspect of the present system. Another aspect allows for quick connect mounting of the auxiliary roof component to a latch assembly coupled to a tilted frame and/or by use of ballast on a horizontal surface. Another aspect of the present system is advantageous over conventional devices since this aspect uses lightweight and strong composite materials for various components of the attachment system. When installed, the latch assembly and roof clamp can optionally provide an electrical grounding path between the auxiliary roof component and the metal roof, or wires attached thereto. Additional advantageous and features of the present invention will become apparent in the following description and appended claims, taking in conjunction with the accompanying drawings.

DETAILED DESCRIPTION

Figure 1:
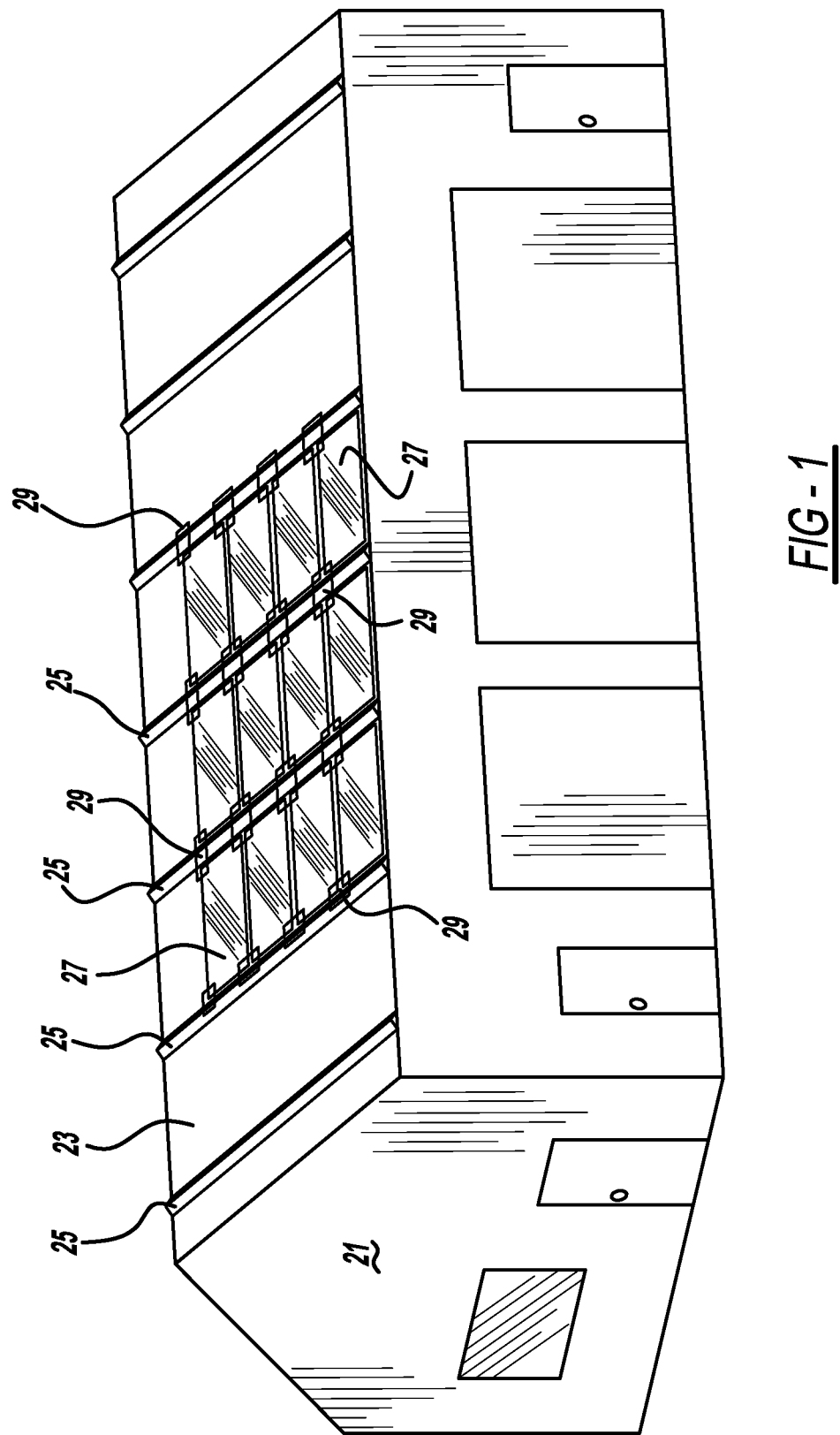
FIG. 1 is a perspective view showing a first preferred embodiment attachment system securing solar panels to a building roof.

FIG. 1 illustrates a building 21 having a tilted roof 23, preferably made from sheet metal sections joined together at folded over, raised standing seams 25. Auxiliary roof components, preferably multiple solar panel assemblies 27, are secured to seams 25 by way of multiple attachment systems 29. Each attachment system 29 includes a roof clamp 31 and a latch assembly 33.

Figure 2:
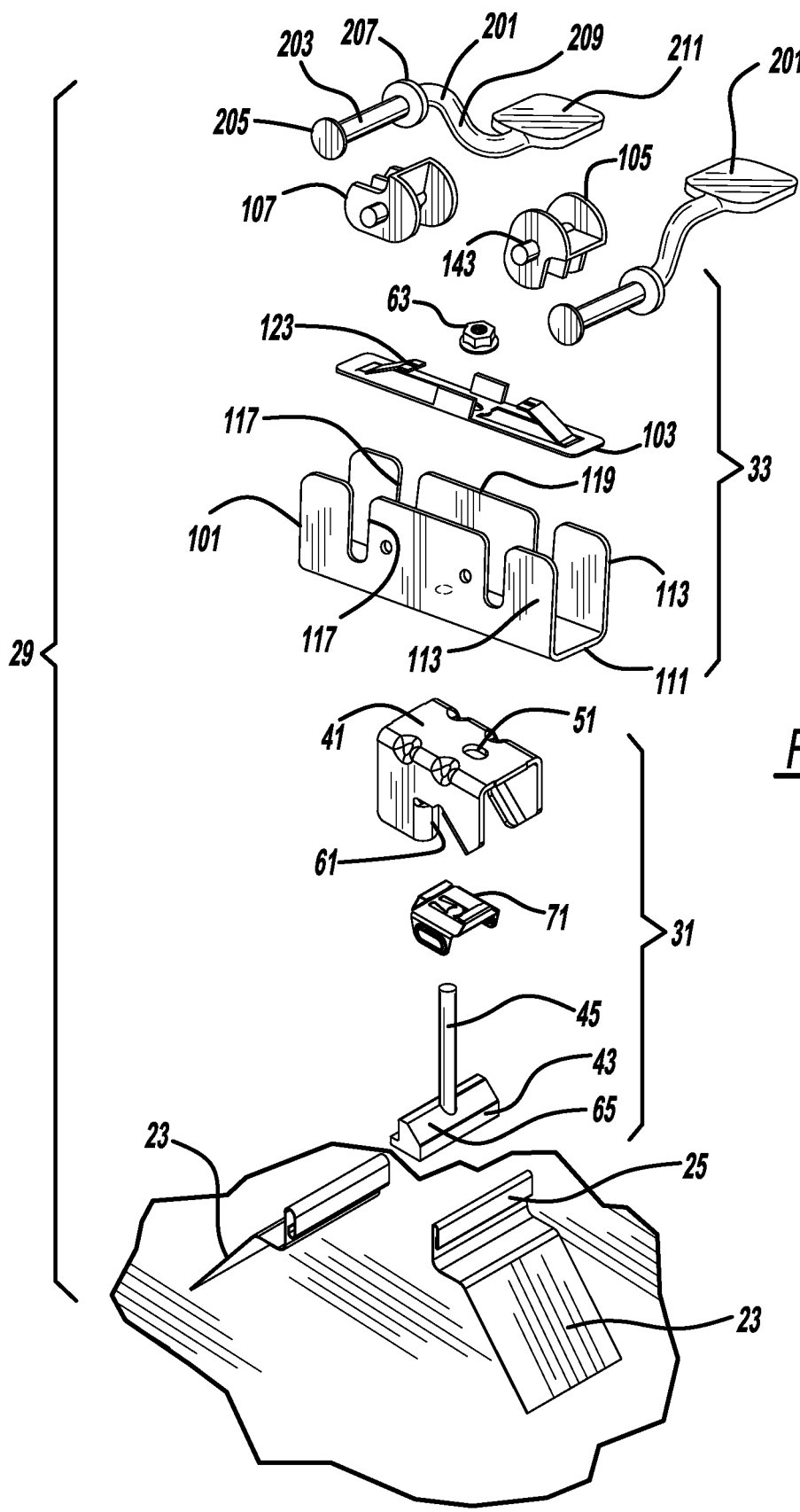
FIG. 2 is an exploded perspective view showing the first preferred embodiment attachment system.
Figure 3:
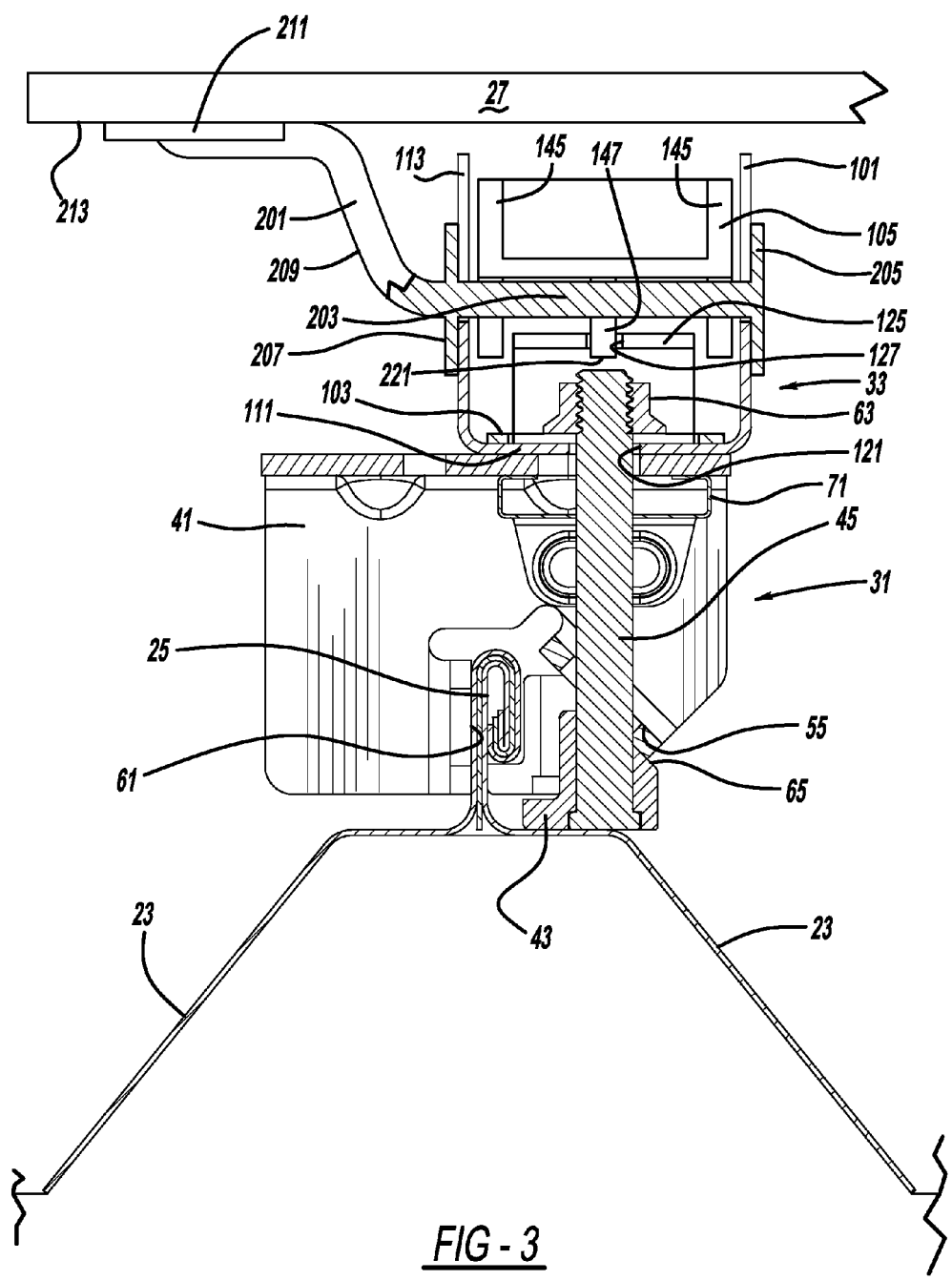
FIG. 3 is a cross-sectional view, taken along line 3-3 of FIG. 4, showing the first preferred embodiment attachment system.
Figure 4:
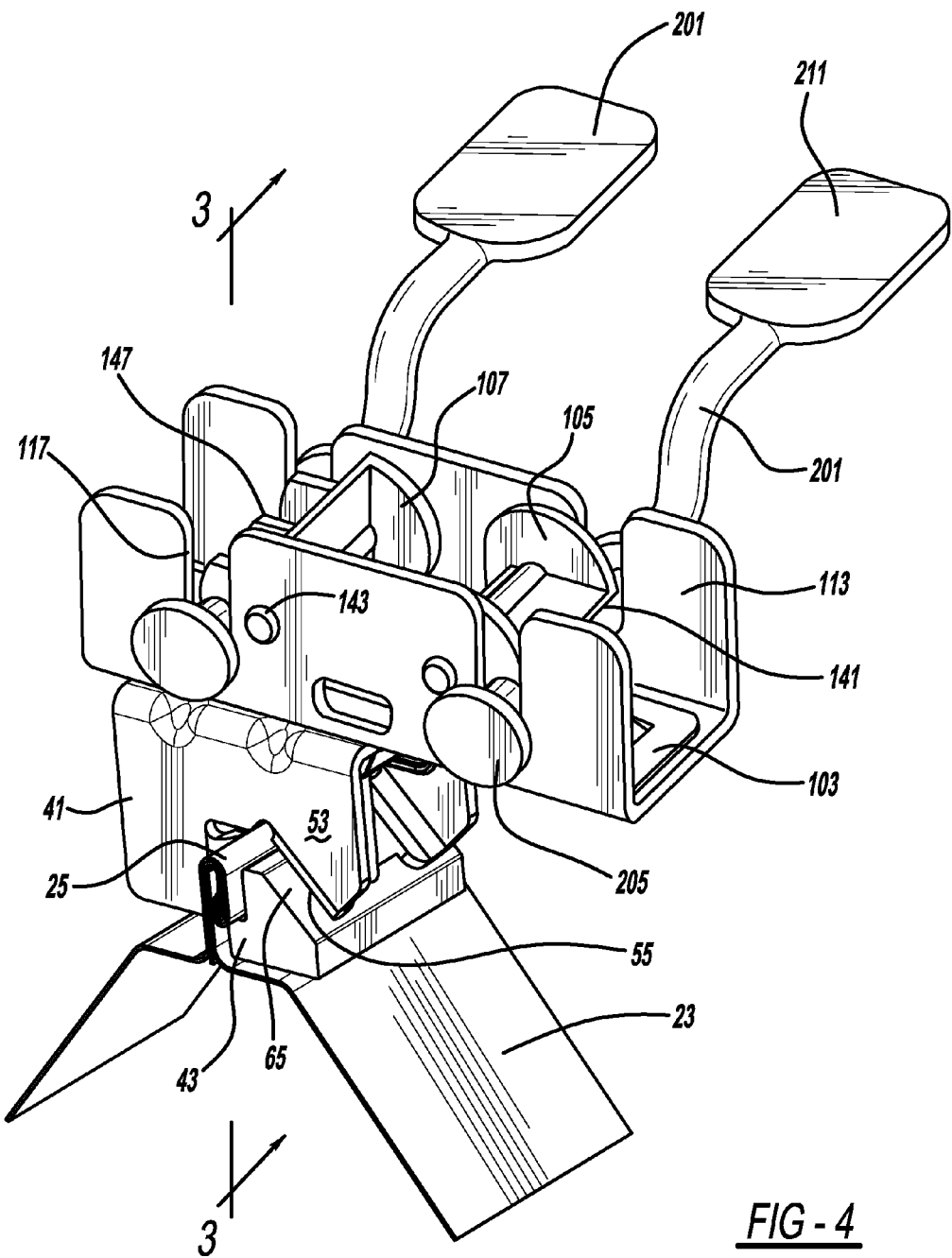
FIG. 4 is a perspective view showing the first preferred embodiment attachment system.
Figure 5:
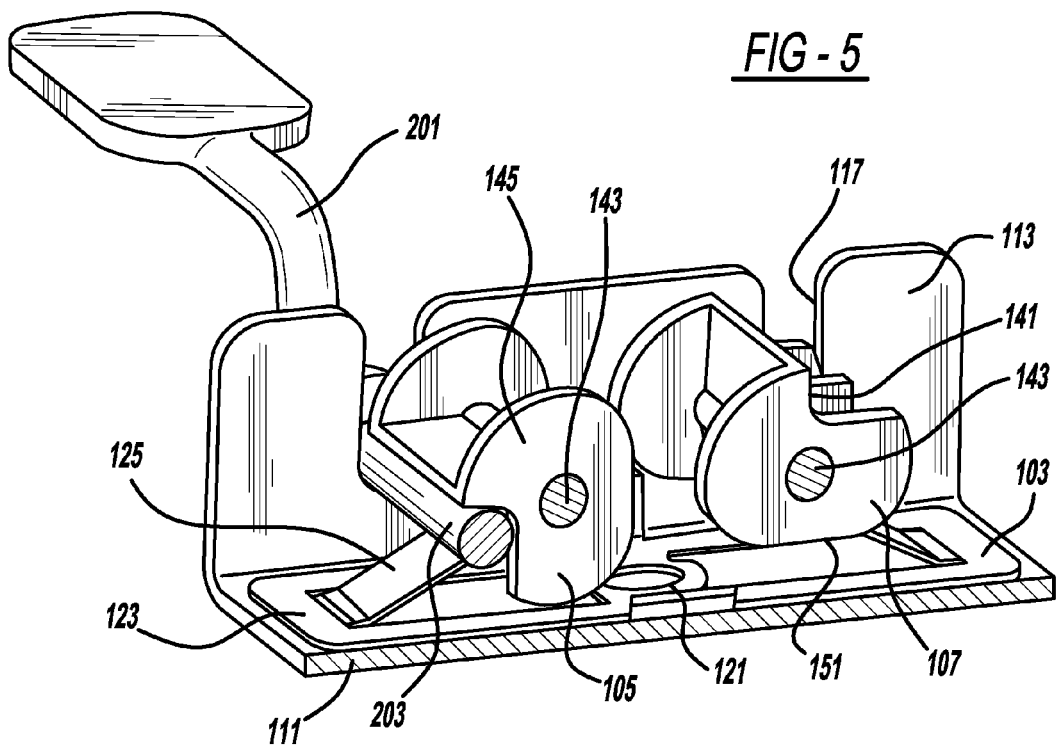
FIG. 5 is a partially fragmented perspective view showing the first preferred embodiment attachment system.
Figure 6:
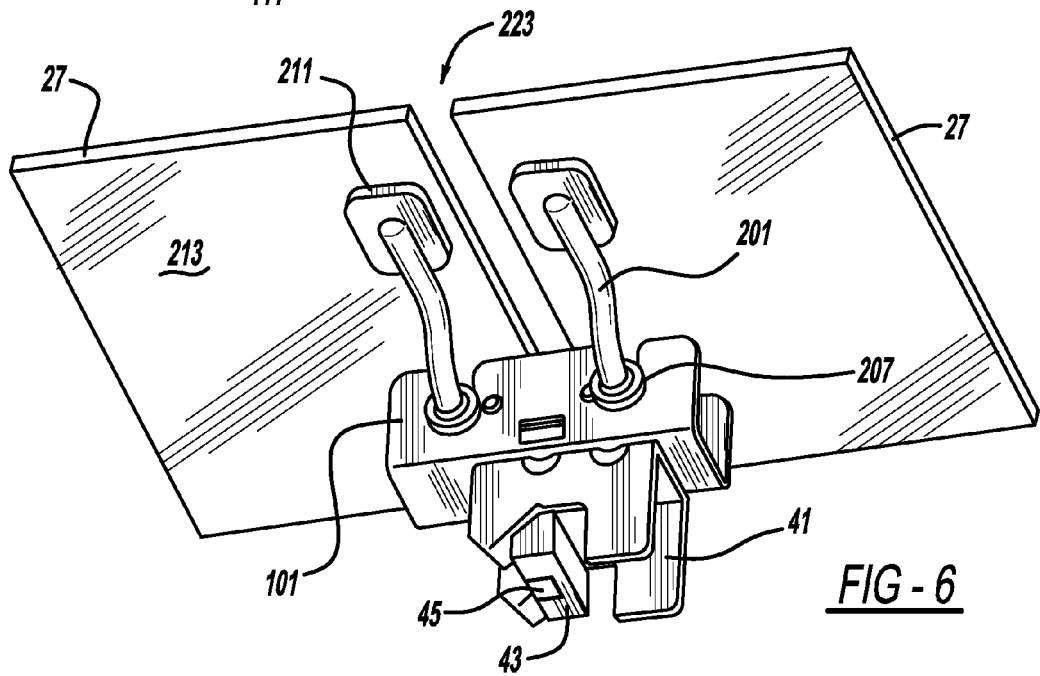
FIG. 6 is a perspective view, generally opposite that of FIG. 4, showing the first preferred embodiment attachment system.
Figure 7:
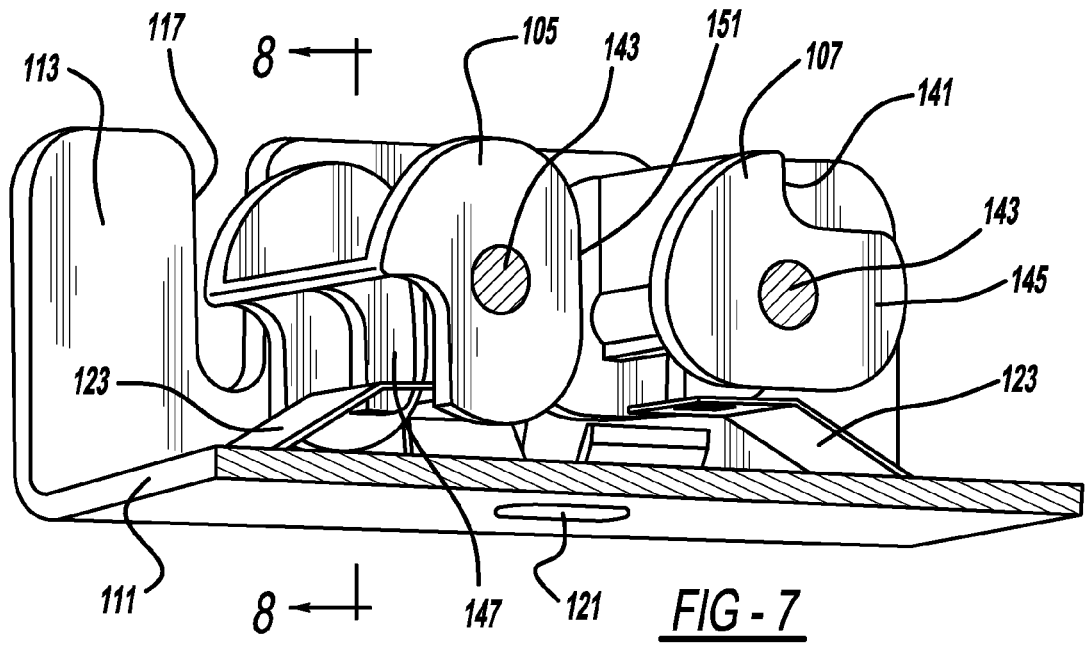
FIG. 7 is a partially fragmented perspective view, like that of FIG. 5, showing the first preferred embodiment attachment system.

FIGS. 2 and 3 depict roof clamp 31 attached to seam 25 of roof 23. Roof clamp 31 includes a saddle 41, a roof seam-engaging wedge 43, and an elongated shaft or securing member 45. An optional part includes a retaining element 71. Securing member 45 fits into and aligns saddle 41 with wedge 43 so that upon engaging securing member 45, camming action of roof seam-engaging wedge 43 along saddle 41 secures roof clamp 31 to roof 23. Notably the same securing member 45 that secures roof clamp 31 to roof 23 also secures an auxiliary-retaining device, such as latch assembly 33, to roof 23 along a top surface of saddle 41.

Saddle 41 further includes a saddle bore 51, two side walls 53, and a camming surface 55 located on each side wall 53. Saddle 41 has an inverted U-shape or a bifurcated yoke body. Furthermore, the saddle top surface serves as the region through which securing member 45 is advanced or retracted so that the roof seam is engaged.

Saddle 41 defines a slot 61 which serves in part to engage seam 25 of roof 23 and also to serve as camming surface 55. Slot 61 includes a substantially vertical access area and is adjacent camming surface 55 to facilitate trapping or clamping the roof seam in the roof clamp.

Roof seam-engaging wedge 43 includes a wedge bore which allows securing member 45 to pass through wedge 43 and into saddle 41. This operates to secure roof clamp 31 on the roof seam and to also secure latch assembly 33 using the single securing member 45 and a nut fastener 63 secured to an upper end thereof. Wedge 43 includes at least one angled surface 65 that mates with camming surface 55 so that when securing member 45 is pulled by tightening nut 63, wedge angled surface 65 moves along camming surface 55 of saddle 41. A polygonal head of securing member 45 is prevented from rotation by a matching recess in a bottom of wedge 43.

Retaining element 71 is disposed between an interior of saddle 41 and a top surface of wedge 43. Protrusions on the inside of saddle 41 mate with retaining element 71. This is either by a snap fit or interference fit to prevent retaining element 71 from becoming dislodged from saddle 41 prior to wedge 43 engaging the roof seam. In another construction, the retaining element can be replaced by a leaf spring secured to the saddle and/or wedge.

Saddle 41, roof seam-engaging wedge 43, securing member 45, and optionally retaining element 71, are pre-assembled prior to placing roof clamp 31 in the proximity of roof seam. "Pre-assembled" for the clamp refers to the components being aligned such that securing member 45 keeps them attached together. This can be achieved either on the ground at the work site, at a remote site, or at the factory at which roof clamp 32 is manufactured. When wedge 43 is retracted to trap seam 25 between an inner foot of the wedge and the inner slot edge of saddle 41, a portion of securing member 45 extends beyond the top surface of saddle 43 such that proximal threaded end of member 45 also provides an attachment point for latch assembly 33.

Referring now to FIGS. 2-7, latch assembly 33 includes a stamped metal bracket 101, a spring steel insert 103 and a pair of latches 105 and 107. Bracket 101 has a generally U-end view shape defined by a generally flat bottom or base wall 111 and a pair of spaced apart and upstanding side walls 113. Multiple slots 117 are provided in each side wall 113 which are openly accessible adjacent a top edge 119 thereof. An aperture 121 is provided in bottom wall 111 of bracket 101 to receive the threaded end of securing member 45 for nut attachment thereto.

Insert 103 is a stamped metal part including an outer ring 123 and a pair of tabs 125 diagonally projecting and biasing upwardly away from bottom wall 111 of bracket 101. A generally horizontal turned flange 125 inwardly projects from each diagonal section of tab 123 within which is an internally slotted receptacle 127. A central hole is also provided in insert 103 to receive member 45 therethrough.

Latches 105 and 107 are in mirrored symmetry to each other and have a generally hook-like shape defined by a somewhat radially extending engagement surface 141. A pivot pin 143 projects laterally from each side wall 145 of latches 105 and 107. The ends of each pin 143 have peripheral grooves therein for a compression fit into the side wall or for receiving circlips external to the side walls, such that pin is rotatably journaled within side walls 113 of bracket 101 to allow pin 143 to rotate with each associated latch. Alternately, the pivot pin can be stationarily affixed to bracket such that each latch rotates about the pin.

Furthermore, a central rib 147 extends from an internal ledge of each latch 105 and 107, which is spaced apart from and between outer walls 145 in a generally parallel configuration. Alternately, each latch may be a single solid piece such that the peripheral surface continuously extends between walls 145 thereby subsuming central rib 147. A peripheral camming surface 151 is provided on walls 145 and 147 such that each tab 123 acts as a cam follower by riding against and controlling motion of camming surface 151 for at least central wall 147, and optionally outer walls 145, of each latch. This camming action serves to urge each latch to either its unlatched position (as shown for latch 107) or its latched position (as shown for latch 105). The latches are preferably made by compressing sintered powder metal, but may alternately be cast metal which is thereafter machined.

A striker arm 201 protrudes from each auxiliary roof component, preferably solar panel 27, for engagement by latch assembly 33. More specifically, each striker 201 includes a generally cylindrical rod 203 bordered by laterally enlarged and generally circular abutment stops 205 and 207. A curved neck 209 ends with a generally flat pad 211 which is adhesively bonded directly to a bottom surface 213 of the glass solar panel with a suitable adhesive, such as that obtained from A. Raybond Sarl as Techbond™ brand polyurethane adhesive. Thus, an expensive and heavy peripheral frame is not required to mount the solar panels 27 to the building roof 23. The strikers 201 are preferably made by compressing sintered powder metal in the present system, but may alternately be cast metal or extruded and then cold head compression formed for the pads.

Figure 8:
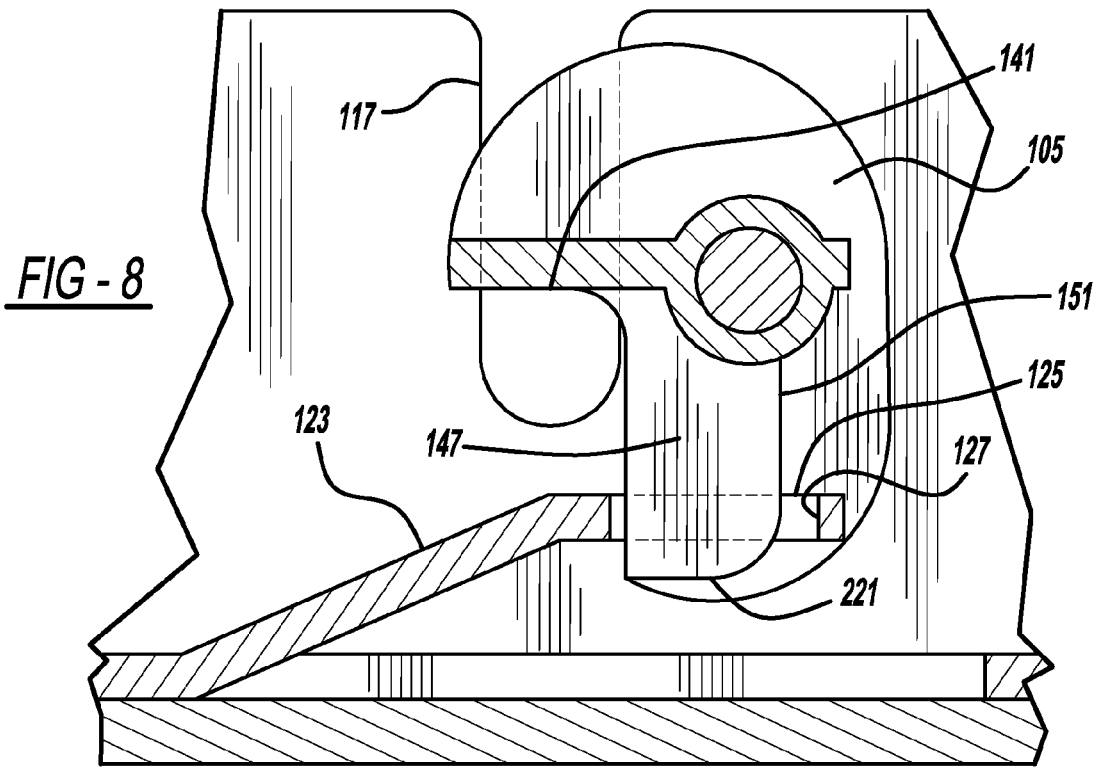
FIG. 8 is a cross-sectional view, taken along line 8-8 of FIG. 7, showing the first preferred embodiment attachment system.

Each striker 201 is preassembled to the associated solar panel 27 either at the solar panel manufacturing plant or on the ground at the job site. Moreover, roof clamp 31 is preassembled onto the roof seam 25 and thereafter, latch assembly 33 is assembled to roof clamp 31 using a single securing member 45 in a top-only access manner. Subsequently, the solar panel assembly, including the preassembled striker 201, is manually lowered by the installer through the associated slots 117 of bracket 101. This single linear motion causes rod 203 of striker 201 to manually rotate latch 107 about pin 143 from its unlatched position to its latched position. In the latched position, a pawl 221 (see FIGS. 3 and 8) protrudes into receptacle slot 127 of spring tab 123, thereby providing a locking function to secure the latch in its latching position. Hence, rod 203 of striker 201 is trapped between latch engaging surface 141 and edges of the bracket side walls defining slots 117. This is done in a quick connect or snap-in manner without requiring tools or threaded fastener engagement.

When it is desired to service or remove solar panels 27, the user can install an elongated tool, such as a flat bladed screw driver, within a gap 223 (see FIG. 6) between solar panels 27. The screw driver is then pushed against an extending end of tab 125 between latches 105 and 107. This tab depression unlocks pawl 221 which allows the user to then manually pull up on the solar panel which, in turn, causes counter rotation of the associated latch toward its unlatched position.

Figure 9:
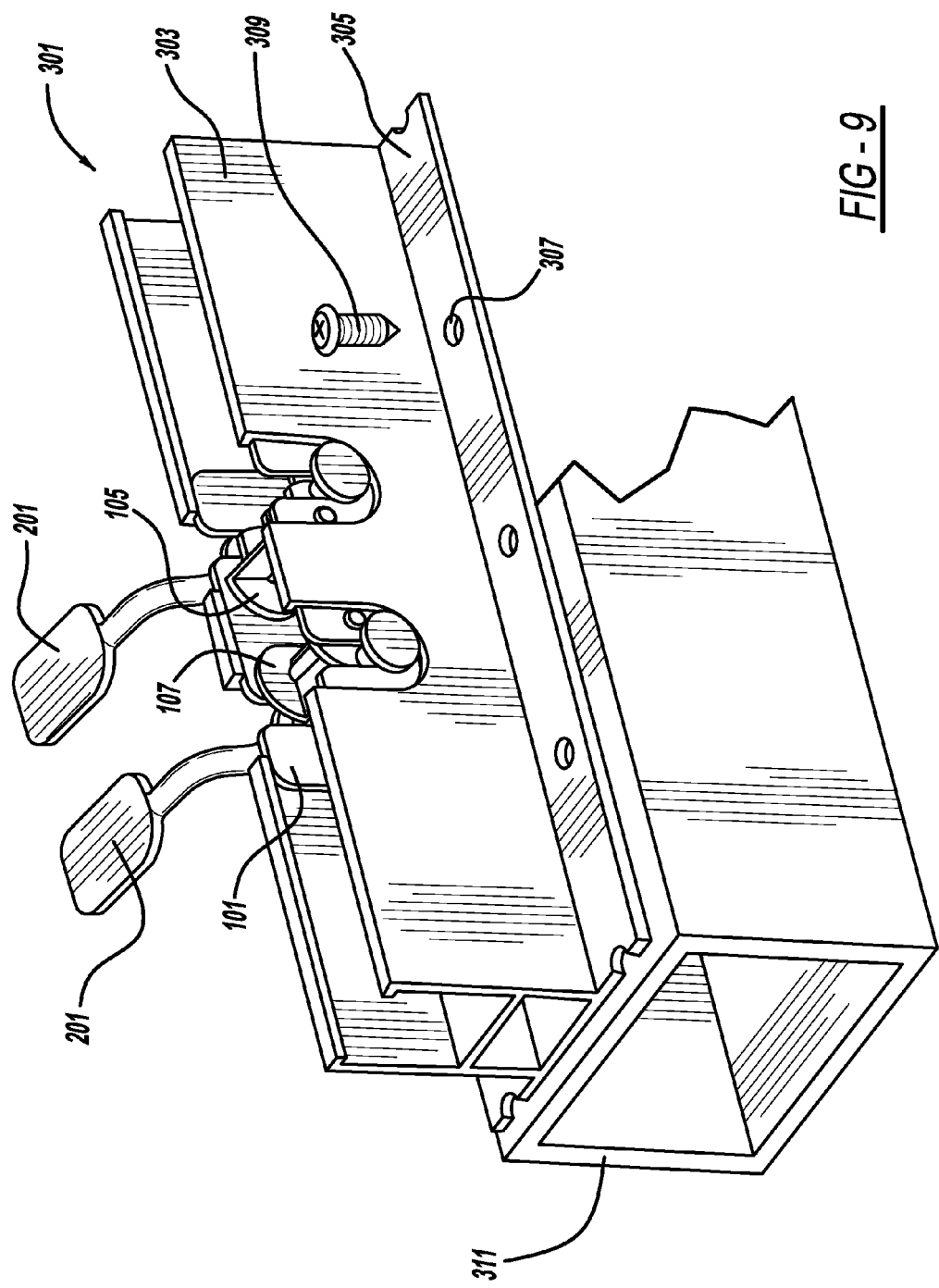
FIG. 9 is a perspective view showing a second preferred embodiment attachment system.

FIG. 9 illustrates another configuration of the latch assembly 301. The bracket 101, insert 103 (not shown), latches 105 and 107, and strikers 201 are the same as the prior embodiment. However, an elongated rail 303 is employed instead of a roof clamp. The bracket and latches are secured within an upper section of rail 303 and upwardly accessible access slots are additionally provided in side walls of rail 303 to match those in bracket 101. Rail 303 has a generally H-end view shape with a bottom flange 305 laterally extending therefrom. A polarity of holes 307 are located in flange 305 such that screws 309, rivets or other fasteners can be inserted therein for attachment to a structural rack or frame 311. Frame 311 is provided with an offset angled configuration relative to a flat or tilted building roof, building side wall, or even on the ground.

Figure 10:
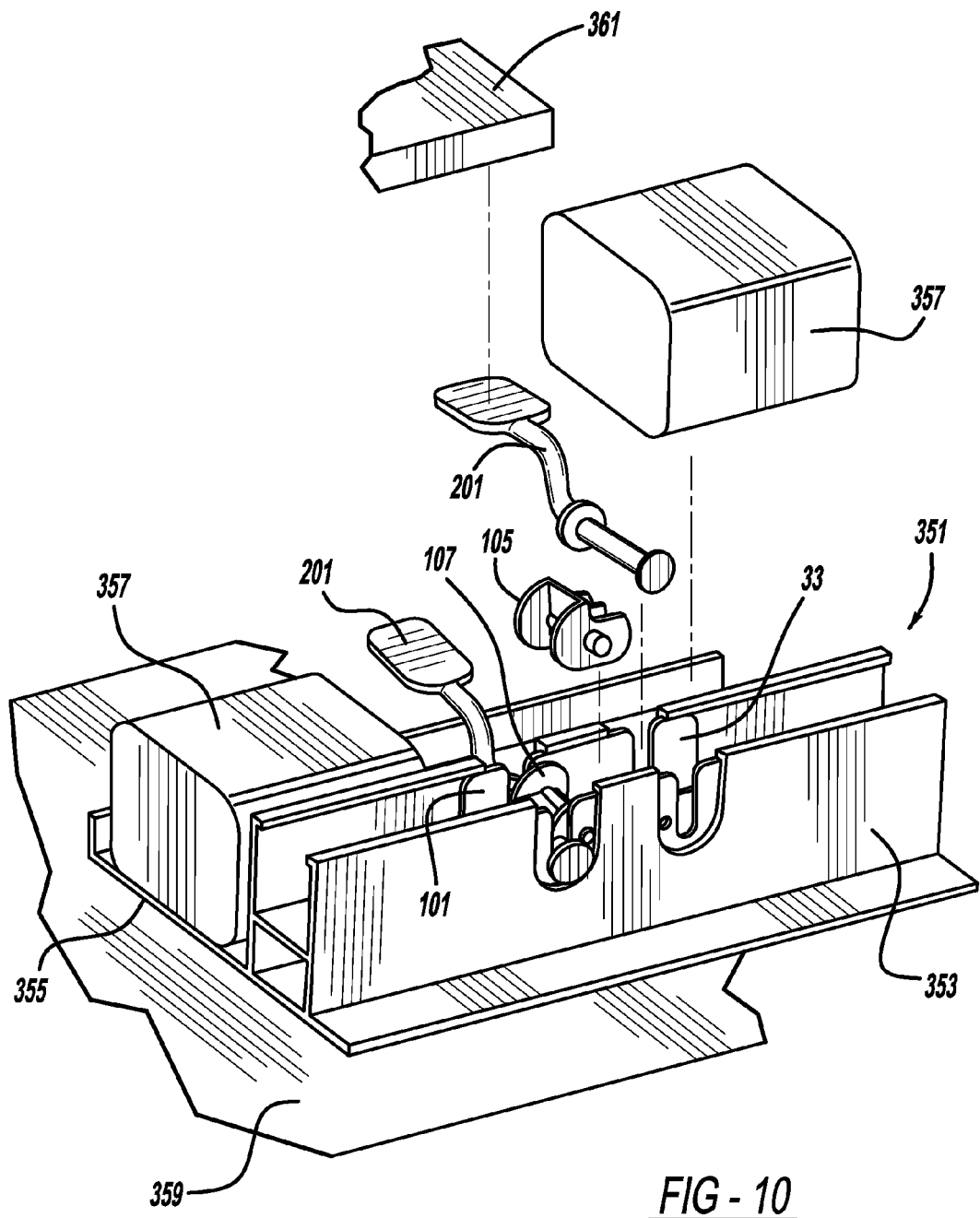
FIG. 10 is a partially exploded perspective view showing a third preferred embodiment attachment system.

Referring now to FIG. 10, another embodiment attachment system 351 includes a latch assembly 33 like that of the first embodiment discussed hereinabove. An elongated rail 353, however, secures bracket 101 therein and includes a laterally extending lower flange 355. Heavy weighted ballast members 357, such as cement blocks, are positioned on flange 355 to hold attachment system 351 onto a flat roof surface 359 without the need for other fasteners or clamps. Additionally, a solar panel or other auxiliary roof component 361, such as a snow guard, pipe, wire conduit, ladder, or the like, can be adhered or otherwise attached onto strikers 201.

It is alternately envisioned that rails 303 and 353, or even bracket 101, are made from a composite material including one or more sheets of long strand (e.g., longer than one inch) fiberglass or carbon fiber, either of a woven or random fiber orientation, in polymeric resin such as epoxy. In one version, a pultrusion process is employed to make this composite material prior to its molding, extruding or shaping into the desired configurations. The edges and slots are cut from the sheets before or after curing, and before or after molding. This process and material advantageously provides a lightweight and very durable component for the attachment system. In another alternate configuration, rails 303 and 353 have a single upstanding wall in the upper segment upon which bracket 101 is clamped between a downwardly open slot edge of the bracket and a camming wedge similar to wedge 43; this would eliminate the need to cut the slots in the pultruded rails.

While various aspects of the present attachment system have been disclosed, it should be appreciated that modifications can be made. For example, the present accessory mounting brackets can be secured to conventional roof clamps such as those disclosed in the following U.S. Pat. No. 7,758,011 entitled "Adjustable Mounting Assembly for Standing Seam Panels" which issued to Haddock on Jul. 20, 2010; U.S. Pat. No. 7,386,922 entitled "Snow-Guard Clamping Unit" which issued to Taylor et al. on Jun. 17, 2008; and U.S. Pat. No. 5,715,640 entitled "Mounting Device for Controlling Uplift of a Metal Roof" which issued to Haddock on Feb. 10, 1998; except many of the present advantages will not be realized. These patents are incorporated by reference herein. Moreover, more or less latches can be attached to a single bracket. It is also envisioned that the attachment system is attachable to an exterior side of a building, although various advantages may not be achieved. Furthermore, the latches can have differing camming and/or striker engaging surfaces, such as internally elongated slots, however, various advantages may not be obtained. The striker can also have different shapes, such as a U-shape, although certain advantages may not be observed. In an alternate embodiment, bracket 101 is integrated into saddle 41 as a single piece. Individual elements or features of a particular embodiment are generally not limited to that particular embodiment, but, where applicable, are interchangeable and can be used in a selected embodiment, even if not specifically shown or described. Such variations are not to be regarded as a departure from the disclosure, and all such modifications are intended to be included within the scope of the present invention.

The invention claimed is:

1. A building attachment system comprising:
   a latch assembly adapted for mounting on a building exterior, the latch assembly comprising a latch movable from an unlatching position to a latching position;
   a striker including a rod and a pad, the pad being adapted for preassembled adhesive attachment to at least one of: (a) a solar panel; (b) a structural frame, (c) a pipe, or (d) a snow guard;
   the rod of the striker being removably attached to the latch assembly by snap-in engagement of the striker and latch; and
   a lock and a pawl coupled to the latch assembly, the pawl engaging the lock to secure the latch when the latch is in the latching position.

2. The system of claim 1, further comprising a spring biasing the lock away from the bracket and toward the latch, the lock including a receptacle, and the pawl being received in the receptacle when the latch is in the latching position.

3. The system of claim 1, wherein the latch is rotatable between the positions, further comprising a second latch rotatable between latching and unlatching positions about a pivot axis offset from that of the first latch, the axes of the latches being attached to a single metal bracket.

4. The system of claim 3, wherein the latch includes a camming surface against which a biased cam follower rides, and the latch includes a hook which traps the striker in the latch assembly when in the latching position.

5. The system of claim 1, wherein the solar panel is attached to the striker, the striker being hidden by the solar panel when attached to the latch assembly.

6. The system of claim 1, wherein the rod of the striker further comprises a cylindrical rod contacting against the latch and the pad further comprises a substantially flat pad adhered directly to a glass back of the solar panel, the striker being preassembled to the solar panel and the latch assembly being assembled to a roof clamp, prior to engagement of the striker with the latch.

7. The system of claim 1, further comprising a clamp secured to a metal roof seam in an unpierced manner, and a single elongated shaft and fastener securing the clamp to the roof seam and the latch assembly to the clamp.

8. The system of claim 1, wherein linear insertion of the striker into an open slot of the latch assembly causes the latch to rotate against a biasing force such that a substantially radial surface of the latch traps the striker within the latch assembly, and the latch assembly is preassembed to a building roof prior to attachment of the striker to the latch.

9. A building roof attachment system comprising:
   a bracket having a roof-facing base wall and at least one side wall, the side wall including an open ended slot;
   pivot pins coupled to the side wall;
   a pair of rotatable latches coupled to the pivot pins, the latches each including a striker-engagement surface offset angled from an adjacent peripheral edge of the latch, the latches each including a camming surface; and
   biased members riding against the camming surfaces of the latches;
   for each of the latches, the engagement surface acting with the slot to create a striker-trapping condition when the latch is a latching position, and the slot being open opposite the roof-facing base wall; and
   the bracket retaining both of the latches.

10. The system of claim 9, wherein for each of the latches, the biased member is part of a lock coupled to the bracket, further comprising a pawl coupled to the latch, the pawl engaging the lock to secure the latch in the latching position.

11. The system of claim 10, wherein the lock includes a receptacle, and the pawl is received in the receptacle when the latch is in the latching position, the biased member being part of the lock which is a leaf spring extending away from one of the walls of the bracket.

12. The system of claim 10, wherein the lock is accessible for user contact even after the striker is attached to the latch, depression of the lock by the user allows disengagement of the pawl from the lock and reverse movement of the latch to the unlatched position when the striker is pulled away from the bracket.

13. The system of claim 9, further comprising a metal roof seam-clamp coupled to the bracket, and a solar panel including the striker extending from a bottom thereof removeably attached to one of the latches.

14. The system of claim 9, further comprising an elongated rail coupled to the bracket, the rail being a long strand fiber and polymeric composite material.

15. The system of claim 9, wherein each latch includes a laterally extending and substantially flat shelf between the camminq surfaces of substantially perpendicular outer walls, the shelf contacting a striker rod in at least one moveable condition.

16. The system of claim 9, further comprising a striker directly adhered to a bottom glass surface of a solar panel, the solar panel hiding the striker after attachment to the associated latch.

17. The system of claim 9, further comprising a striker, linear insertion of the striker into an open slot of the latch assembly cause an associated one of the latches to rotate against a biasing force such that a substantially radial surface of the latch traps the striker within the bracket, and the bracket being preassembed to the building roof prior to attachment of the striker to the latch.

18. A method of installing an auxiliary component to a building, the method comprising:
   (a) securing a latch assembly to an exterior of the building;
   (b) preassembling a striker to the auxiliary component;
   (c) inserting a rod of the striker into a stationary slot of the latch assembly after steps (a) and (b);
   (d) rotating a latch of the latch assembly solely by the rod of the striker contacting a surface of the latch in a single insertion motion and in a tool-free manner; and
   (e) retaining the latch in an orientation attached to the striker.

19. The method of claim 18, further comprising adhering the striker to a bottom of the component which is a solar panel.

20. The method of claim 18, wherein the securing further comprises attaching a clamp to a standing seam of a roof of the building and fastening the latch assembly to the clamp with no more than a single fastener which also secures the clamp to the roof.

* * * * *